United States Patent
Miki et al.

(10) Patent No.: US 7,067,173 B2
(45) Date of Patent: Jun. 27, 2006

(54) METHOD FOR MANUFACTURING LAMINATED ELECTRONIC COMPONENT

(75) Inventors: Takeshi Miki, Omihachiman (JP); Satoru Noda, Hikone (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/848,365

(22) Filed: May 19, 2004

(65) Prior Publication Data

US 2004/0213901 A1    Oct. 28, 2004

Related U.S. Application Data

(62) Division of application No. 10/247,636, filed on Sep. 20, 2002, now abandoned.

(30) Foreign Application Priority Data

Sep. 20, 2001    (JP) .............................. 2001-287488

(51) Int. Cl.
*B05D 5/12*    (2006.01)
*H01G 7/00*    (2006.01)
(52) U.S. Cl. ............................ 427/79; 427/80; 427/81; 29/25.41; 29/25.42
(58) Field of Classification Search ................ 427/79, 427/80, 81; 29/25.41, 25.42
See application file for complete search history.

(56) References Cited

U.S. PATENT DOCUMENTS

| | | | |
|---|---|---|---|
| 2,819,170 A | 1/1958 | Short | |
| 2,822,279 A * | 2/1958 | Larsen et al. ............... 106/1.14 |
| 3,929,674 A | 12/1975 | Patterson | |
| 4,101,710 A * | 7/1978 | Marcus ........................ 428/472 |
| 6,103,146 A * | 8/2000 | Okamoto ..................... 252/514 |
| 6,338,809 B1 | 1/2002 | Hampden-Smith et al. | |
| 6,342,732 B1 * | 1/2002 | Ochiai et al. ............... 257/734 |

FOREIGN PATENT DOCUMENTS

| | | |
|---|---|---|
| EP | 0 764 618 | 3/1997 |
| JP | 2001-189188 | 7/2001 |
| SU | 792292 B | 12/1980 |

OTHER PUBLICATIONS

Copy of Japanese Examination Report dated Oct. 5, 2004 (and English translation of same).

* cited by examiner

*Primary Examiner*—Brian K. Talbot
(74) *Attorney, Agent, or Firm*—Dickstein, Shapiro, Morin & Oshinsky, LLP.

(57) ABSTRACT

Provided is a Ag-based conductive paste for a terminal electrode which suppresses oxidation of the Ni surface of an internal conductor and therefore brings about excellent joining with Ni even when baking is performed in the atmosphere in the case where Ni is used as the internal conductor of a laminated ceramic electronic component. The conductive paste includes at least one of an Ag powder and an Ag alloy powder, a nickel boride powder, an inorganic binder and an organic vehicle, wherein the quantity of the nickel boride powder is within the range of about 5% by weight or more, but less than about 60% by weight of the total paste.

12 Claims, 2 Drawing Sheets

METHOD FOR MANUFACTURING LAMINATED ELECTRONIC COMPONENT

This is a division of application Ser. No. 10/247,636, filed Sep. 20, 2002 now abandoned.

BACKGROUND OF THE INVENTION

1. Field of the Invention

The present invention relates to a conductive paste, especially a conductive paste suitable for forming a terminal electrode of a laminated ceramic electronic component, for example, a monolithic ceramic capacitor and a laminated positive temperature coefficient thermistor. The present invention also relates to a method for manufacturing a laminated ceramic electronic component using the conductive paste and the resulting laminated ceramic electronic component.

2. Description of the Related Art

Hitherto, Ag, Ag—Pd, etc., have been used as a material for an internal electrode of a monolithic ceramic capacitor, which is one of laminated ceramic electronic components. However, these internal electrode materials are expensive and, therefore, a base metal, Ni, which is a less expensive material has come into use. On the other hand, Ag having excellent conductivity and capable of being baked at a low temperature has been used as a terminal electrode material of the monolithic ceramic capacitor. For example, a Ni layer has been formed on this terminal electrode made of Ag, and a solder layer or a Sn layer has been further formed in order to enhance soldering and, thereby the monolithic ceramic capacitor has been produced.

As an internal electrode material for a laminated positive temperature coefficient thermistor, one of laminated ceramic electronic components, Ni in ohmic contact with ceramic has been used as an n-type impurity semiconductor. Laminated ceramic green sheets and internal electrodes have been fired simultaneously under a reducing atmosphere. Subsequently, terminal electrodes have been baked in the atmosphere while the ceramic itself has been oxidized again and, therefore, the laminated positive temperature coefficient thermistor having a desired positive temperature coefficient of resistance has been produced.

Ni and Ag do not form a solid solution with each other. Consequently, when Ni is used as the internal electrode of the monolithic ceramic capacitor and Ag is used as the terminal electrode, it is difficult to join the internal electrode and the terminal electrode and, therefore, there is a problem in that a desired capacitance cannot be achieved.

Cu, which makes a solid solution with Ni at any ratio, has been noted as the terminal electrode. However, it is necessary to conduct the baking under a reducing atmosphere when the terminal electrode is formed by baking a Cu-containing paste since Cu is likely to be oxidized and, therefore, an increase in the manufacturing cost is realized. Furthermore, since the oxygen concentration is low in the reducing atmosphere, the decomposition rate of the vehicle in the conductive paste is reduced, and there is a problem in that the carbon residue may affect characteristics.

Likewise, when Ag capable of being baked in the atmosphere is used as the terminal electrode material in the case of the laminated positive temperature coefficient thermistor, no mutual solid solution with Ni of the internal electrode is brought about and, therefore, joining is unlikely to occur. Examples of other terminal electrode pastes capable of being baked in the atmosphere include an Al paste and a Zn paste. However, baking electrodes of these Al and Zn pastes have poor solderability and, in addition, there is a problem in that when electrolytic plating is attempted thereon, the Al or Zn electrode itself elutes into an electrolytic solution.

SUMMARY OF THE INVENTION

Accordingly, it is an object of the present invention to provide an Ag-based conductive paste which suppresses oxidation of the Ni surface of an internal conductor and, therefore, brings about excellent joining with Ni, even when the terminal electrode is baked in the atmosphere in the case where Ni is used as the internal conductor of a laminated ceramic electronic component, for example, a monolithic ceramic capacitor and a laminated positive temperature coefficient thermistor. It is also an object of the present invention to provide a method for manufacturing a laminated ceramic electronic component in which the terminal electrode is formed using the conductive paste, and a laminated ceramic electronic component.

In order to achieve the aforementioned objects, a conductive paste according to the present invention includes at least one of an Ag powder and an Ag alloy powder, a nickel boride powder, an inorganic binder and an organic vehicle, wherein the quantity of the aforementioned nickel boride powder is within the range of about 5% by weight or more, but less than about 60% by weight of the total paste.

Preferably, the average particle diameter of the aforementioned nickel boride powder is about 150 µm or less.

Preferably, the aforementioned inorganic binder is at least one selected from the group consisting of bismuth borate glass, bismuth borosilicate glass and zinc borosilicate glass.

A method for manufacturing a laminated ceramic electronic component according to the present invention is provided with the steps of preparing a ceramic green sheet, forming an internal conductor layer made of nickel or primarily containing nickel on the ceramic green sheet, laminating the resulting ceramic green sheets on which the internal conductor layer has been formed so as to form a laminate, firing the resulting laminate so as to produce a sintered material, and applying a coating of the aforementioned conductive paste in order to electrically connect to the internal conductor of the resulting sintered material and performing baking so as to form a terminal electrode.

A laminated ceramic electronic component according to the present invention is manufactured by the aforementioned method for manufacturing a laminated ceramic electronic component.

Preferably, the aforementioned ceramic green sheet is a dielectric ceramic green sheet and the aforementioned laminated ceramic electronic component is a monolithic ceramic capacitor.

Preferably, the aforementioned ceramic green sheet is a semiconductor ceramic green sheet and the aforementioned laminated ceramic electronic component is a laminated positive temperature coefficient thermistor.

As is clear from above description, the Ag-based conductive paste of the present invention contains nickel boride powder in the paste. Consequently, by using the conductive paste of the present invention for forming terminal electrodes of laminated ceramic electronic components, for example, monolithic ceramic capacitors and laminated positive temperature coefficient thermistors, using Ni as internal conductors, even when the baking is performed in the atmosphere, oxidation of the Ni surface of the internal electrode is suppressed, the Ni and Ag form a solid solution, and excellent joining of Ni of the internal electrode and Ag of the terminal electrode can be achieved.

That is, by using the Ag-based conductive paste containing the nickel boride powder of the present invention, the terminal electrodes can be formed by baking in the atmosphere with respect to laminated ceramic electronic components using Ni as internal conductors.

DESCRIPTION OF THE PREFERRED EMBODIMENTS

The conductive paste of the present invention includes at least one of an Ag powder and an Ag alloy powder, a nickel boride powder, an inorganic binder and an organic vehicle, wherein the quantity of the nickel boride powder is within the range of about 5% by weight or more, but less than about 60% by weight of the total paste.

Since at least one of the Ag powder and the Ag alloy powder constitutes the conductive powder in the conductive paste of the present invention, it is possible to bake the paste in the atmosphere. When the coating and baking are performed on a laminated ceramic sintered material having the Ni internal electrode in order to connect to the Ni internal electrode, oxidation of Ni as the internal electrode is suppressed by the nickel boride powder contained in the conductive paste. Furthermore, no solid solution is brought about using Ni as the internal electrode and Ag as the terminal electrode only. However, when nickel boride is involved, Ni as the internal electrode and Ag as the terminal electrode can be made into a solid solution.

The nickel boride powder is desirably about 5% by weight or more. When less than about 5% by weight, an oxide film is formed on the surface of Ni as the internal electrode and, therefore, electrical contact resistance is observed. On the other hand, when the nickel boride powder is about 60% by weight or more, the conductivity of the baking film is degraded.

Preferably, the average particle diameter of the nickel boride powder is about 150 μm or less. When more than about 150 μm, the nickel boride powder remains in the baked electrode film, and the function as a conductor may not be performed.

The bismuth borate glass, bismuth borosilicate glass and zinc borosilicate glass containing no Pb are preferable as the inorganic binder from the viewpoint of the environment.

Regarding the viscosities of these sorts of glass at a high temperature, the operating points (log η(Pa·s)=4) are preferably about 600° C. or less. This is because the baking temperature of the Ag powder or the Ag alloy powder is usually about 600° C. to 900° C., and it is desirable to form the electrode by liquid phase sintering at this temperature.

The quantity of this inorganic binder is desirably about 1% to 20% by volume of the total volume (volume of the solid matter) of the Ag powder and/or Ag alloy powder, inorganic binder and nickel boride powder in the conductive paste. When it is less than about 1% by volume, the adhesion strength of the baking electrode becomes poor, and when it is more than 20% by volume, the baking electrode does not exhibit conductivity.

According to the method for manufacturing a laminated ceramic electronic component of the present invention, a coating of the aforementioned conductive paste is applied and baked onto a laminated ceramic provided with the internal conductor made of Ni or primarily containing Ni and, therefore, the terminal electrode is formed.

Figure 1:
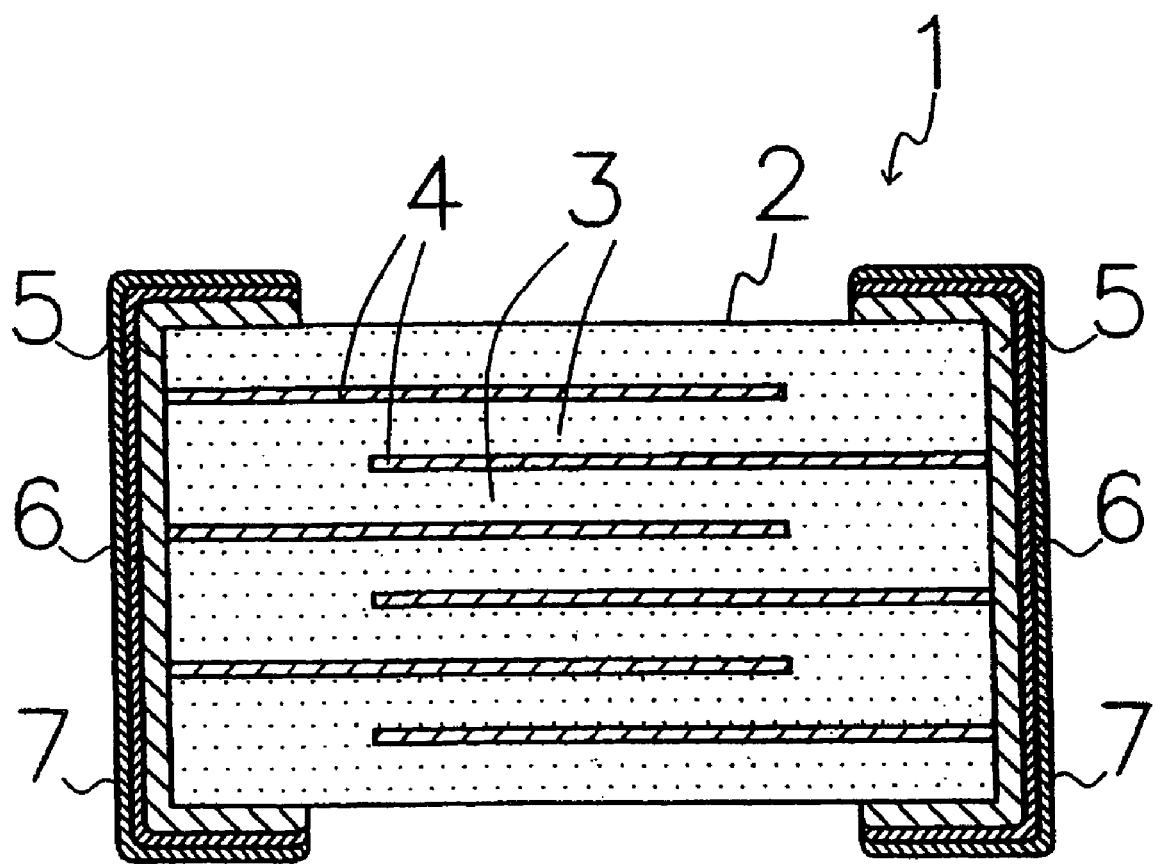
FIG. 1 is a sectional view showing a monolithic ceramic capacitor which is an example of the laminated ceramic electronic component of the present invention.

The method for manufacture will be described below with respect to an example in which the laminated ceramic electronic component is the monolithic ceramic capacitor 1 shown in FIG. 1.

A dielectric ceramic material powder of $BaTiO_3$, for example, is prepared and is made into slurry. The resulting slurry is molded into the shape of a sheet and, therefore, a ceramic green sheet for a dielectric ceramic layer 3 is produced.

An internal conductor layer for forming an internal electrode 4 made of Ni or primarily containing Ni is formed on the resulting ceramic green sheet by screen printing, etc. Subsequently, a required number of the ceramic green sheets on which an internal conductor layer has been formed are laminated in order to bring about the condition of being held between the ceramic green sheets on which no internal conductor layer has been formed, the laminate plies are pressure-bonded and, therefore, a green laminate is produced.

The resulting green laminate is fired in a predetermined nonoxidative atmosphere at a predetermined temperature and, therefore, a sintered material 2 is produced.

Terminal electrodes 5 are formed on both end surfaces of the sintered material 2 in order to electrically connect to specific internal electrodes 4 and, therefore, a monolithic ceramic capacitor is completed. These terminal electrodes 5 are produced by applying and baking the coating of the aforementioned conductive paste of the present invention.

If necessary, plating layers 6 of Ni, Cu, etc., are formed on the terminal electrodes 5, and plating layers 7 of solder, Sn, etc., are further formed thereon.

Figure 2:
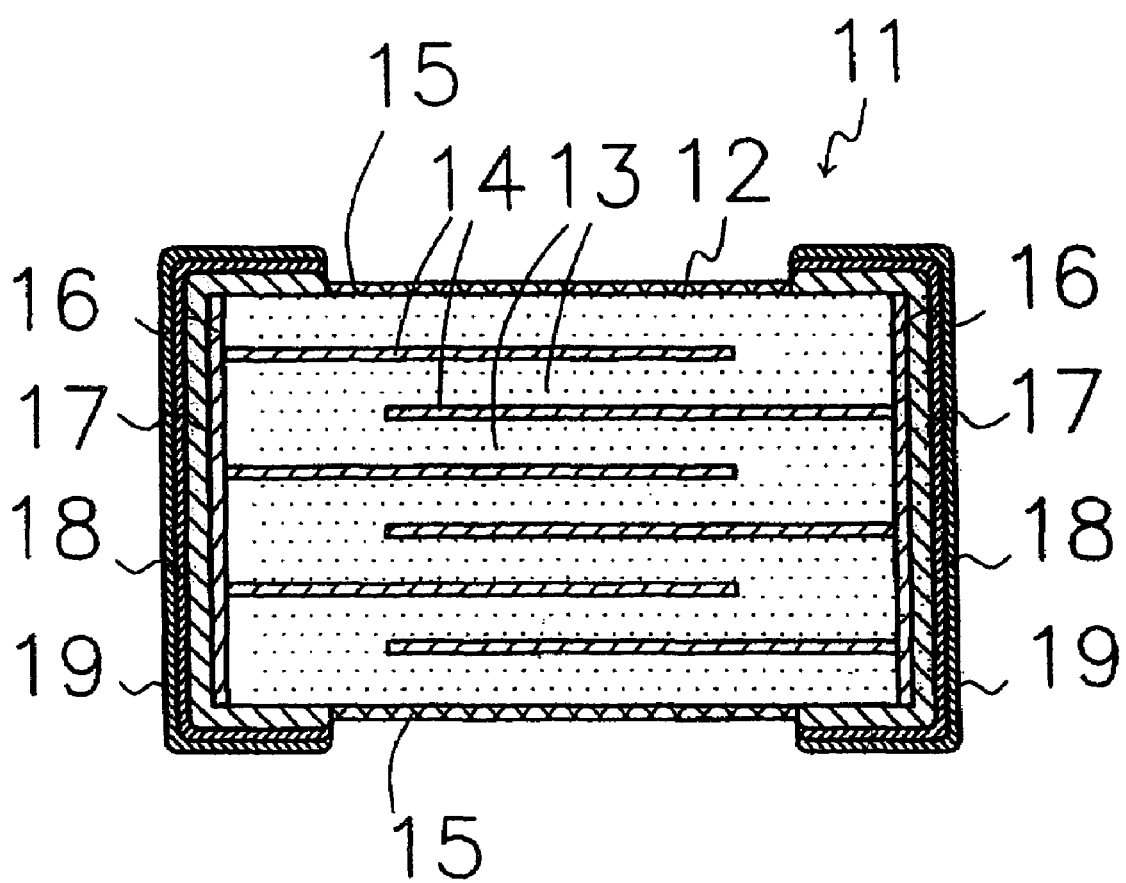
FIG. 2 is a sectional view showing a laminated positive temperature coefficient thermistor which is an example of the laminated ceramic electronic component of the present invention.

FIG. 2 shows a laminated positive temperature coefficient thermistor as another example of the laminated ceramic electronic component of the present invention.

A laminated positive temperature coefficient thermistor 11 is provided with a sintered material 12 composed of a plurality of semiconductor ceramic layers 13 laminated and Ni internal electrodes 14 formed along the specific interfaces between the semiconductor ceramic layers 13. Terminal electrodes 17 are formed on both end surfaces of the sintered material 12 in order to electrically connect to specific internal electrodes 13.

In the case of the laminated positive temperature coefficient thermistor, the surfaces of the ceramic element assembly are covered with glass layers 15 in contrast to the aforementioned monolithic ceramic capacitor. End surface electrodes 16 are formed from the same Ni as the internal electrodes in order to stabilize the joining with the internal electrodes. Terminal electrodes 17 are formed by applying and baking the coating of the conductive paste of the present invention on the end surface electrodes 16.

If necessary, plating layers 18 of Ni are formed on the terminal electrodes 17, and plating layers 19 of solder, Sn, etc., are further formed thereon.

EXAMPLES

Example 1

The case where a chip electronic component is a monolithic ceramic capacitor will be described in the present Example 1.

As starting materials, predetermined quantities of $TiCl_4$ and $Ba(NO_3)_2$ were weighed individually, and were reacted with oxalic acid and, thereby a precipitate of barium titanyl oxalate $(BaTiO(C_2O_4).4H_2O)$ was produced. This precipitate was thermally decomposed at a temperature of 1,000° C. or more and, thereby $BaTiO_3$ was synthesized as a primary component.

An oxide, carbonate or hydroxide of individual components were weighed, were mixed and milledto prepare a powder having a compositional ratio of $0.25Li_2O$-$0.65$ $(0.30TiO_2.0.70SiO_2)$-$0.10Al_2O_3$ (mole ratio). The resulting mixed powder was heated to 1,500° C. in a platinum crucible, was quenched and, thereafter, was milled so as to produce an oxide powder having an average particle diameter of 1 μm or less as a first secondary component.

An oxide, carbonate or hydroxide of individual components were weighed, were mixed and milledto prepare a powder having a compositional ratio of $0.66SiO_2$-$0.17TiO_2$-$0.15BaO$-$0.02MnO$ (mole ratio). The resulting mixed powder was heated to 1,500° C. in a platinum crucible, was quenched and, thereafter, was milled so as to produce an oxide powder having an average particle diameter of 1 μm or less as a second secondary component.

The resulting primary component, the first secondary component and the second secondary component were weighed at a ratio of the primary component: the first secondary component: the second secondary component=99:0.5:0.5 (weight ratio). Polyvinyl butyral as a binder, ethanol as a solvent, etc., were added to the resulting weighed materials, mixing was performed with a ball mill and, thereby a ceramic slurry was produced. Subsequently, sheet molding was performed by a doctor blade method using the resulting ceramic slurry and, therefore, a rectangular ceramic green sheet 35 μm thick was produced.

A conductive paste primarily containing Ni was printed on the resulting ceramic green sheet and, thereby a conductive paste layer was formed as an internal conductor layer.

A plurality of ceramic green sheets on which the conductive paste layer had been formed were laminated in order that the sides on which the conductive paste layer reached the edge appeared on alternate layers, while being held between the ceramic green sheets on which no conductive paste layer had been formed, these were pressure-bonded and, thereby a green laminate was produced.

The laminate was heated in a $N_2$ atmosphere at a temperature of 350° C. in order to decompose the binder, and was then fired in a reducing atmosphere composed of an $H_2$—$N_2$—$H_2O$ gas at the partial pressure of oxygen of $10^{-9}$ to $10^{-12}$ MPa at 1,300° C. for 2 hours and, thereby a sintered material was produced.

On the other hand, a conductive paste was prepared. That is, an Ag powder, a nickel boride powder represented by a chemical formula $Ni_2B$, and a zinc borosilicate-based glass powder as an inorganic binder were dispersed in an organic vehicle containing ethyl cellulose as a resin component with a kneader, for example, a triple roller mill, so as to produce the conductive paste. Ratios of the Ag powder and the nickel boride powder in the paste were as shown in Table 1, and the zinc borosilicate-based glass powder was specified to be 2% by weight.

The exposed end surfaces of the internal electrodes of the sintered material produced as described above were coated with this conductive paste, and baking was performed in the atmosphere at a temperature shown in Table 1 for an hour and thereby terminal electrodes were formed. Subsequently, a Ni plating and a Sn plating were formed on the terminal electrodes and, thereby a monolithic ceramic capacitor was produced.

Regarding the monolithic ceramic capacitor produced as described above, the capacitance and the dielectric loss (tan δ) were measured at a temperature of 20° C. under the conditions of 1 kHz and 1 Vrms. The results are shown in Table 1. In Table 1, asterisked sample numbers indicate samples which are out of the scope of the present invention, and all of the other samples are within the scope of the present invention.

TABLE 1

| Sample No. | Quantity of nickel boride ($Ni_2B$) (wt %) | Quantity of silver (Ag) (wt %) | Baking temperature (° C.) | Capacitance (nF) | Dielectric loss (%) |
|---|---|---|---|---|---|
| *1 | 0 | 70 | 800 | 10.2 | 4.21 |
| *2 | 3.0 | 67 | 800 | 12.4 | 4.14 |
| 3 | 5.0 | 65 | 800 | 20.8 | 3.48 |
| 4 | 23.8 | 46.2 | 800 | 22.5 | 2.58 |
| 5 | 23.8 | 46.2 | 825 | 22.3 | 2.78 |
| 6 | 23.8 | 46.2 | 850 | 21.8 | 3.01 |
| 7 | 25.0 | 45 | 800 | 22.7 | 2.56 |
| 8 | 50.0 | 20 | 800 | 21.1 | 2.98 |
| *9 | 60.0 | 10 | 800 | 17.4 | 4.01 |

As is clear from Table 1, the monolithic ceramic capacitors (Samples 3 to 8) produced using the conductive paste of the present invention have a capacitance of 20 nF or more and a dielectric loss of 3.5% or less and, therefore, characteristics superior to those which are out of the scope of the present invention (Samples 1, 2, and 9) are achieved. Furthermore, as is clear from comparisons among Samples 4 to 6, even when the baking temperature is increased, the reduction of capacitance and the increase of dielectric loss are controlled at low levels. This is because oxidation of the Ni surface of the internal electrode is suppressed, the Ni and Ag form a solid solution, and excellent joining of Ni of the internal electrode and Ag of the terminal electrode can be achieved by the nickel boride powder contained in the conductive paste.

Example 2

The case where a chip electronic component is a laminated positive temperature coefficient thermistor will be described in the present Example 2.

As starting materials, $BaCO_3$, $TiO_2$, and $Sm_2O_3$ were weighed in order that $(Ba_{0.9998}Sm_{0.0002})TiO_3$ could be attained. Pure water was added to the resulting powder, and these were mixed and milled with zirconia balls in a ball mill for 16 hours, were dried and, thereafter, were calcined at 1,200° C. for 2 hours so as to produce a calcined powder.

Polyvinyl butyral as a binder, ethanol as a solvent, etc., were added to the calcined powder produced as described above, and mixing was performed in a ball mill so as to produce ceramic slurry. Subsequently, sheet molding was performed by the doctor blade method using the resulting ceramic slurry and, thereby a rectangular ceramic green sheet 35 μm thick was produced.

A conductive paste primarily containing Ni was printed on the resulting ceramic green sheet and, therefore, a conductive paste layer was formed as an internal conductor layer.

A plurality of ceramic green sheets on which the conductive paste layer had been formed were laminated in order that the sides where the conductive paste layer reached an edge appeared on alternate layers, while being held between the ceramic green sheets on which no conductive paste layer had been formed, and these were pressure-bonded and, thereby a green laminate was produced. The end surfaces of the resulting green laminate were coated with a Ni paste prepared beforehand, drying was performed and, thereafter, firing was performed in a reducing atmosphere in which $H_2/N_2=0.03$ by volume ratio at 1,200° C. for 2 hours so as to produce a sintered material provided with end surface electrodes of Ni.

The aforementioned sintered material was immersed in an aqueous solution containing glass having a softening temperature of 500° C. to 800° C. and an operating temperature of 800° C. to 1,150° C., the softening temperature being lower and the operating temperature being higher than the baking temperature of a conductive paste described later, and thereafter, was dried and was furthermore heat-treated at 500° C. to 600° C. so as to form a glass layer about 0.5 to 5 μm thick.

A conductive paste was prepared as follows. That is, an Ag powder, a nickel boride powder represented by a chemical formula $Ni_2B$ and a zinc borosilicate-based glass powder as an inorganic binder were dispersed in an organic vehicle containing ethyl cellulose as a resin component with a kneader, for example, a triple roller mill, so as to produce the conductive paste. Ratios of the Ag powder and the nickel boride powder in the paste were as shown in Table 2, and the zinc borosilicate-based glass powder was specified to be 2% by weight.

The Ni end surface electrodes of the sintered material produced as described above, with glass layers being formed on the surfaces thereof, were coated with this conductive paste, and baking was performed in the atmosphere at a temperature shown in Table 2 for an hour and, thereby terminal electrodes were formed. Subsequently, a Ni plating and a Sn plating were formed on the terminal electrodes and, thereby a laminated positive temperature coefficient thermistor was produced.

Regarding the laminated positive temperature coefficient thermistor produced as described above, the initial resistance at a temperature of 25° C. and the rate of change of resistance (α=(resistance at 150° C.)/(resistance at 130° C.)) between temperatures of 130° C. and 150° C. were measured. The results are shown in Table 2. In Table 2, asterisked sample numbers indicate samples which are out of the scope of the present invention, and all of the other samples are within the scope of the present invention.

TABLE 2

| Sample No. | Quantity of nickel boride ($Ni_2B$) (wt %) | Quantity of silver (Ag) (wt %) | Baking temperature (° C.) | Initial resistance (Ω) | Rate of change of resistance (α) |
|---|---|---|---|---|---|
| *10 | 0 | 70 | 700 | 2.80 | 9.5 |
| *11 | 3.0 | 67 | 700 | 1.56 | 9.6 |
| 12 | 5.0 | 65 | 700 | 0.10 | 10.6 |
| 13 | 23.8 | 46.2 | 600 | 0.10 | 10.5 |
| 14 | 23.8 | 46.2 | 700 | 0.09 | 10.6 |
| 15 | 23.8 | 46.2 | 800 | 0.10 | 10.4 |
| 16 | 25.0 | 45 | 700 | 0.10 | 10.8 |
| 17 | 50.0 | 20 | 700 | 0.09 | 10.7 |
| *18 | 60.0 | 10 | 700 | 1.03 | 7.2 |

As is clear from Table 2, the initial resistances at a temperature of 25° C. of the laminated positive temperature coefficient thermistors (Samples 12 to 17) produced using the conductive paste of the present invention, satisfy 0.1Ω±10%, the resistances do not increase due to formation of the terminal electrodes, and the rates of change of resistance (α) between 130° C. and 150° C. are as large as 10 or more and, therefore, characteristics superior to those of Samples 10, 11, and 18, which are out of the scope of the present invention, are achieved. Furthermore, even when the baking temperature is increased, fluctuations in the initial resistances and reduction of the rates of change of resistance (α) are not specifically observed, as is clear from comparisons among Samples 13 to 15. This is because oxidation of the Ni surface of the internal electrode is suppressed, Ni and Ag form a solid solution, and excellent joining of Ni of the internal electrode and Ag of the terminal electrode can be achieved by the nickel boride powder contained in the conductive paste.

In each of the aforementioned Examples 1 and 2, the case where the conductive powder in the conductive paste was the Ag powder was shown. However, similar effects can be achieved when the conductive powder is an Ag alloy powder, that is, an alloy powder primarily containing Ag.

Similar effects can be exerted by NiB, $Ni_3B$, $Ni_4B_3$, etc., other than $Ni_2B$ as the nickel boride.

What is claimed is:

1. A method for manufacturing a laminated ceramic electronic component, comprising providing a sintered laminate comprising a plurality of ceramic plies and at least one conductor comprising nickel between a pair of said plies, applying a coating of a conductive paste in order to electrically connect to the conductor of the sintered laminate and baking so as to form a terminal electrode, wherein the conductive paste comprises:

at least one of an Ag powder and an Ag alloy powder;

about 5% by weight or more but less than about 60% by weight of the total paste of a nickel boride powder;

an inorganic binder; and an organic vehicle.

2. A method for manufacturing a laminated ceramic electronic component according to claim 1, wherein the average particle diameter of the nickel boride powder is about 150 μm or less.

3. A method for manufacturing a laminated ceramic electronic component according to claim 2, wherein the inorganic binder is at least one member selected from the group consisting of bismuth borate glass, bismuth borosilicate glass and zinc borosilicate glass.

4. A method for manufacturing a laminated ceramic electronic component according to claim 1, wherein the inorganic binder is at least one member selected from the group consisting of bismuth borate glass, bismuth borosilicate glass and zinc borosilicate glass.

5. A method for manufacturing a laminated ceramic electronic component according to claim 4, wherein the ceramic plies are dielectric.

6. A method for manufacturing a laminated ceramic electronic component according to claim 4, wherein the ceramic plies are semiconductive.

7. A method for manufacturing a laminated ceramic electronic component according to claim 3, wherein the ceramic plies are dielectric.

8. A method for manufacturing a laminated ceramic electronic component according to claim 3, wherein the ceramic plies are semiconductive.

9. A method for manufacturing a laminated ceramic electronic component according to claim 2, wherein the ceramic plies are dielectric.

10. A method for manufacturing a laminated ceramic electronic component according to claim 2, wherein the ceramic plies are semiconductive.

11. A method for manufacturing a laminated ceramic electronic component according to claim 1, wherein the ceramic plies are dielectric.

12. A method for manufacturing a laminated ceramic electronic component according to claim 1, wherein the ceramic plies are semiconductive.

* * * * *